United States Patent [19]
Wong et al.

[11] Patent Number: 5,822,231
[45] Date of Patent: Oct. 13, 1998

[54] TERNARY BASED SHIFTER THAT SUPPORTS MULTIPLE DATA TYPES FOR SHIFT FUNCTIONS

[75] Inventors: Roney S. Wong, Sunnyvale; Edward H. Yu, Newark, both of Calif.

[73] Assignee: Samsung Electronics Co., Ltd., Rep. of Korea

[21] Appl. No.: 741,991

[22] Filed: Oct. 31, 1996

[51] Int. Cl.⁶ .................................................. G06F 7/00
[52] U.S. Cl. ....................................... 364/715.08
[58] Field of Search ................. 364/715.04, 715.08; 377/64, 73, 77, 80, 81

[56] References Cited

U.S. PATENT DOCUMENTS

| | | | |
|---|---|---|---|
| 4,839,839 | 6/1989 | Tokumaru et al. | 364/715.08 |
| 4,931,925 | 6/1990 | Utsumi et al. | 364/715.08 X |
| 5,130,940 | 7/1992 | Omote | 364/715.08 |
| 5,671,166 | 9/1997 | Omote | 364/715.08 |

OTHER PUBLICATIONS

Mead and Conway, "Introduction to VLSI Systems", pp. 159–161, Addison–Wesley Publishing Company, Philippines (1980).

*Primary Examiner*—Chuong Dinh Ngo
*Attorney, Agent, or Firm*—Skjerven, Morrill, MacPherson, Franklin & Friel; Mark Zagorin

[57] ABSTRACT

A modular two level nine bit shift apparatus has a second level shifter which receives nine input data bits and second level shift signals. The second level shifter shifts the nine data bits by 0, 3 or 6 bit positions according to the second level shift signals and outputs nine second level data bits. A first level shifter receives the nine second level data bits and first level shift signals. The first level shifter shifts the nine second level data bits by 0, 1 or 2, bit positions according to the first level shift signals. The first and second level shifter combine to provide a shift of from 0 to 8 bits. The nine bit shifter can also accommodate eight bit data. The 9 bit shift count is decoded by dividing the count into a first block (0, 1, 2), a second block (3, 4, 5) and a third block (6, 7, 8). Block select signals select one of the first, second and third blocks and the bit select signals select one of the three shift counts within each block. A decode of the block select signals are coupled to the second level shifter as the second level shift signal and a decode of the bit select signals are coupled to the first level shifter as the first level shift signal. Therefore, the block select signals specify shifts of 0, 3, or 6 bits and the bit select signals specify shifts of 0, 1 or 2 bits, to specify a total shift of between 0 and 8 bits. The nine bit two level modular shifter can be used to create a wider shift comprised of three levels. The third level shifter which includes 4 9-bit 4:1 multiplexers, receives thirty six input bits and third level shift signals. The third level shifter outputs the thirty six input bits shifted by 0, 9, 18, or 27, which are then supplied to four two level 9 bit shifters to provide a full 36 bit shift/rotate operation.

27 Claims, 7 Drawing Sheets

| SHIFT COUNT | | | | BLOCK SELECT | | BIT SELECT | |
|---|---|---|---|---|---|---|---|
| 8 | 4 | 2 | 1 | DECODE BITS | DECODE VALUE | DECODE BITS | DECODE VALUE |
| 0 | 0 | 0 | 0 |  | 0 |  | 0 |
| 0 | 0 | 0 | 1 | 00ZZ | 0 | xxnn | 1 |
| 0 | 0 | 1 | 0 |  | 0 |  | 2 |
| 0 | 0 | 1 | 1 | X011 | 1 |  | 0 |
| 0 | 1 | 0 | 0 | X10X | 1 | xnxn | 1 |
| 0 | 1 | 0 | 1 |  | 1 |  | 2 |
| 0 | 1 | 1 | 0 | X11X | 2 |  | 0 |
| 0 | 1 | 1 | 1 | 1XXX | 2 | nxxn | 1 |
| 1 | 0 | 0 | 0 |  | 2 |  | 2 |

X IS DON'T CARE
Z IS ZERO
nn = {00,01,10,11}

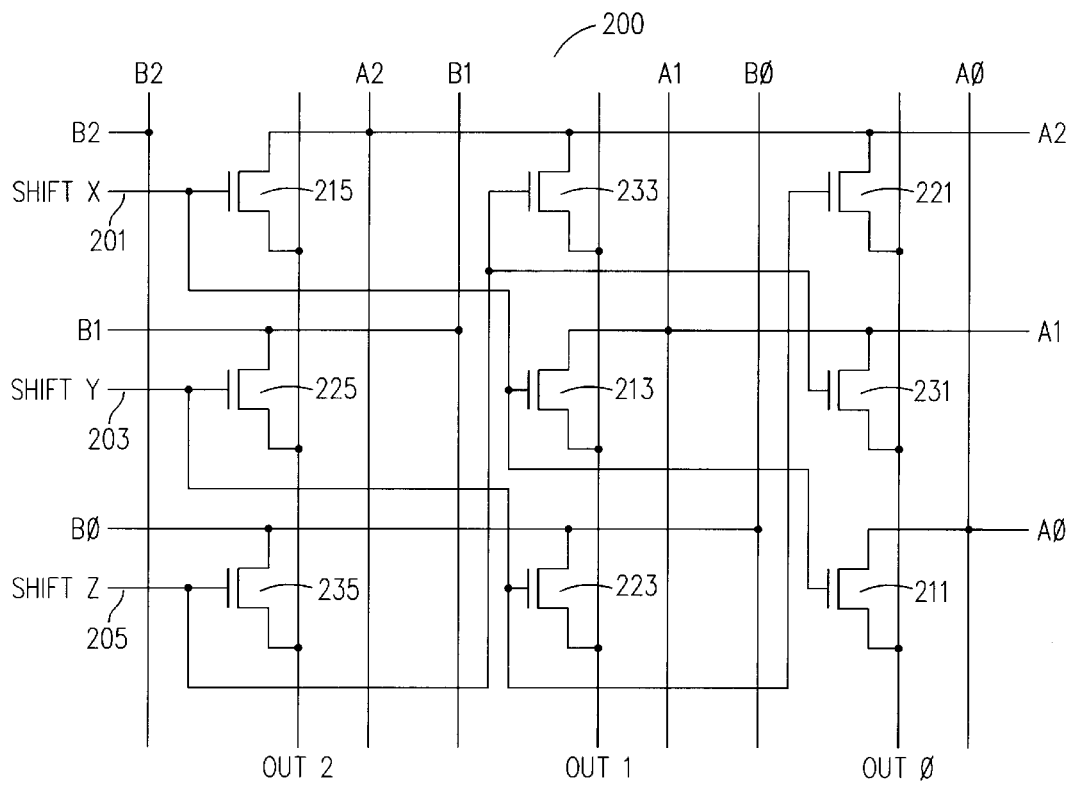
FIG. 2
| | OUT 2 | OUT 1 | OUT 0 | FUNCTION | ROTATE LEFT B BUS | ROTATE RIGHT A BUS | LOGICAL SHIFT LEFT B BUS | LOGICAL SHIFT RIGHT A BUS |
|---|---|---|---|---|---|---|---|---|
| SHIFT X | A2 | A1 | A0 | PASS A | 0 | 0 | 0 | 0 |
| SHIFT Y | B1 | B0 | A2 | A>>2 OR B<<1 | 1 | 2 | 1 | 2 |
| SHIFT Z | B0 | A2 | A1 | A>>1 OR B<<2 | 2 | 1 | 2 | 1 |
FIG. 3a
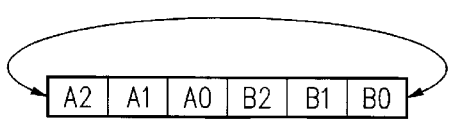
FIG. 3b

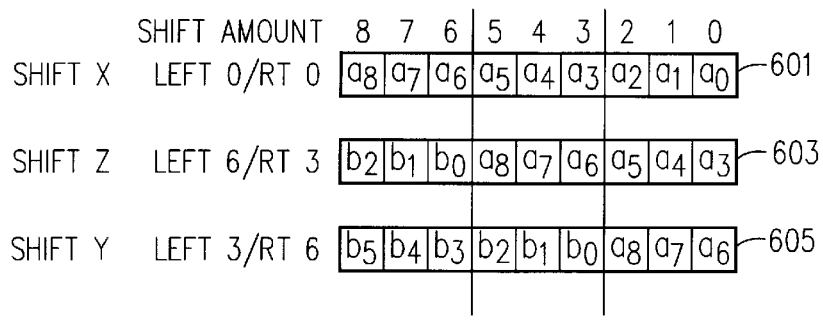
FIG. 6a
| SHIFT COUNT | SHIFT AMOUNT | | 2ND LEVEL | | 1ST LEVEL | | LOGICAL SHIFT CONTROLS |
|---|---|---|---|---|---|---|---|
| | BLOCK | BIT | RIGHT | LEFT | RIGHT | LEFT | |
| 0 0000 | 0 | 0 | X | X | X | X | |
| 1 0001 | | 1 | X | X | Z | Y | SHIFT1 |
| 2 0010 | | 2 | X | X | Y | Z | SHIFT2 |
| 3 0011 | 3 | 0 | Z | Y | X | X | |
| 4 0100 | | 1 | Z | Y | Z | Y | SHIFT1 |
| 5 0101 | | 2 | Z | Y | Y | Z | SHIFT2 |
| 6 0110 | 6 | 0 | Y | Z | X | X | |
| 7 0111 | | 1 | Y | Z | Z | Y | SHIFT1 |
| 8 1000 | | 2 | Y | Z | Y | Z | SHIFT2 |
FIG. 6b
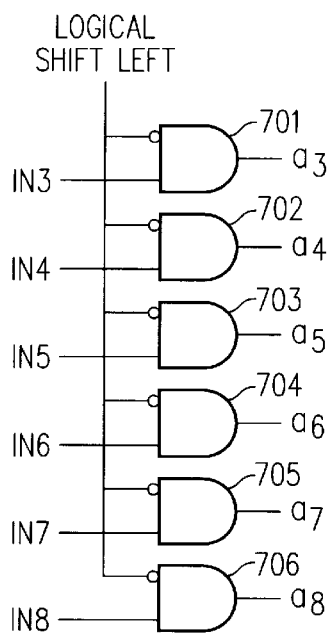
FIG. 7a
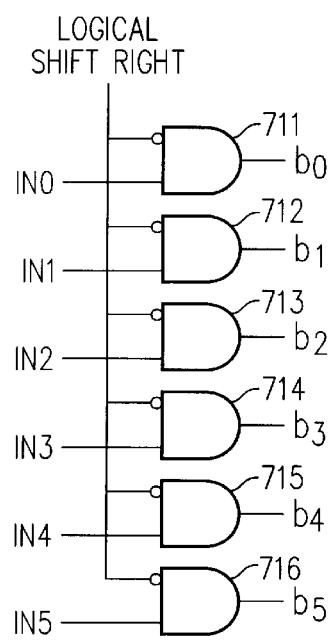
FIG. 7b

TERNARY BASED SHIFTER THAT SUPPORTS MULTIPLE DATA TYPES FOR SHIFT FUNCTIONS

BACKGROUND OF THE INVENTION

1. Field of the Invention

This invention relates to shift/rotate circuitry and more particularly to a ternary based shift/rotate circuit that supports multiple data types.

2. Description of the Related Art

Eight and sixteen bit shifters are known in the art. Some applications however, use data with other than eight bit formats or multiples thereof. Eight bit data can be found in, e.g., image processing applications where eight bits can be used to represent each color in a 24 bit RGB color scheme. In the Moving Picture Experts Group (MPEG) standard, the use of unsigned eight bit data is common. However, processing of eight bit data can result in 9 bit data, e.g., 9 bit signed data. Accordingly, in order to rotate or shift data where the processing results in 9 bits, an eight bit shifter would be too small.

A classical binary shifter used for nine bit data requires four levels of logic for a full sixteen bit shift (4 levels $\rightarrow 2^{24}$ = 16). However, a 16 bit shifter may not always be appropriate. For example, when performing saturation logic for arithmetic left shift and rounding logic for arithmetic right shift, all data bits left or right shifted out need to be available at the block boundaries. A 16 bit, four level design may not provide the necessary availability at nine bit block boundaries. Further, a 16 bit, four level design is not an efficient design for nine bit data. Accordingly, it would be advantageous to have a shifter that could handle eight or nine bits of data in a modular fashion in order to maintain flexibility to handle a variety of data types, but still achieve efficiency.

SUMMARY OF THE INVENTION

Therefore, the invention provides a shift apparatus which is modular and can efficiently accommodate a data size of nine bits. Further, the invention provides an efficient nine bit shift apparatus that can perform rotate functions. The invention also provides a 9 bit modular shift apparatus which can provide logical shift functions, in which zeros are shifted into the word towards the direction of the shift. Further, the shift apparatus can accommodate both eight and nine bit data. Accordingly, a two level nine bit shift apparatus according to the invention comprises a second level shifter which receives nine input data bits and a second level shift signal. The second level shifter shifts the nine data bits by 0, 3 and 6 bit positions according to second level shift signals and outputs nine second level data bits. A first level shifter is coupled to the second level shifter and receives the nine second level data bits and first level shift signals. The first level shifter shifts the nine second level data bits by 0, 1 or 2, bit positions according to the first level shift signal. The first and second level shifter combine to provide a shift of from 0 to 8 bits.

A ternary based decode of the shift count exploits nine bit shift operations. The nine bit shift apparatus responds to block select signals and bit select signals which in combination indicate a shift count of 0 to 8. The decode of the shift count assumes that the shift count has three blocks, each of the blocks including three shift counts. The first block includes the shift count of 0, 1 and 2. The second block includes the shift count of 3, 4, and 5, and the third block includes the shift count of 6, 7 and 8. A decoder decodes the shift count to provide the block select signals to the second level, the block select signals specifying a shift of either 0, corresponding to the first block, 3, corresponding to the second block, or 6, corresponding to the third block. The decoder decodes the shift count to provide bit select signals to the first level shifter, the bit select signals specifying one of the three shifts counts of 0, 1, and 2, within each block.

The nine bit two level modular shifter can be used to create a wider shifter comprised of three levels. The three level shift/rotate unit comprises a third level shifter receiving thirty six input bits and third level shift signals. The third level shifter outputs the thirty six input bits rotated by one of 0, 9, 18, and 27 bits as thirty six third level output bits. A second level shifter is coupled to the thirty six first level output bits and a second level shift signal. The second level shifter outputs the thirty six third level output bits shifted by 0, 3 and 6 bit positions, according to second level shift signals, as thirty six second level output bits. A first level shifter is coupled to the thirty six second level output bits. The first level shifter shifts the thirty six second level data bits by 0, 1 or 2, bit positions according to first level shift signals. The first, second and third level shifter provide a shift of 0 to 35 bits for the thirty six input bits.

BRIEF DESCRIPTION OF THE DRAWINGS

The present invention may be better understood, and its numerous objects, features, and advantages made apparent to those skilled in the art by referencing the accompanying drawings wherein the use of the same reference signals indicates similar or identical items.

FIG. 2 shows a 3-bit ternary based barrel shifter block.

FIG. 3a shows the functions performed by the three bit shift block in response to the control signals.

FIG. 3b shows the rotate function of the 3-bit barrel shift block.

FIG. 6a shows the shift/rotate function of the second level shifter.

FIG. 6b shows a decode table for the shift signals provided to the two level shifter.

FIGS. 7a and 7b show the second level fill-in control for shift operations.

DESCRIPTION OF THE PREFERRED EMBODIMENTS

Figures 1A, 1B:
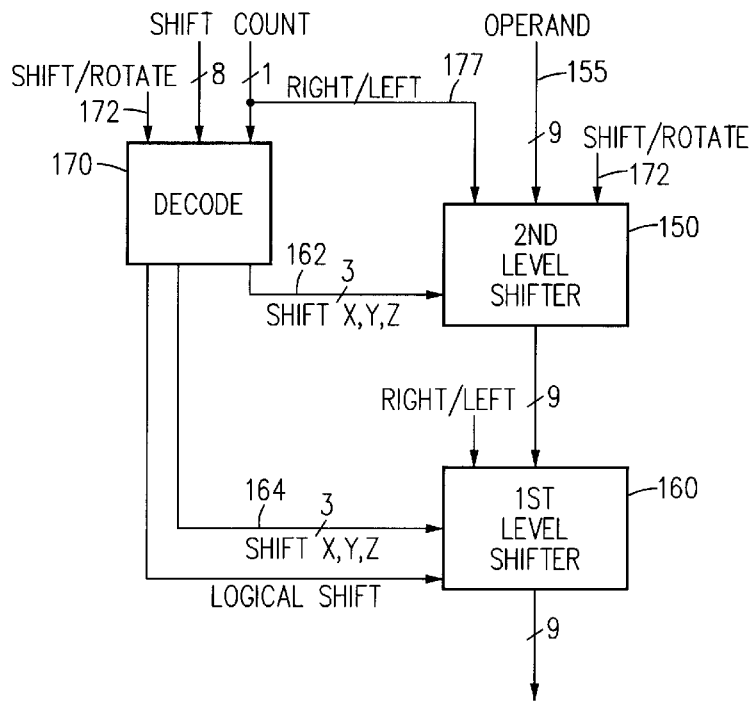
FIG. 1a shows a high level block diagram of a first embodiment of the invention.
FIG. 1b shows a decode table for a nine bit shifter according to the present invention.

Referring to FIG. 1a, a high level block diagram of one embodiment of the present invention is shown. A 9 bit operand is provided over signals lines 155 to a second level shifter 150. The second level shifter shifts the operand by 0, 3 or 6 bit positions depending upon the second level shift control signals 162. The first level shifter 160 receives the nine bits output from the second level shifter 150. The first level shifter 160 shifts the operands by 0, 1 or 2 bit positions according to the first level shift control signals 164. A decoder 170 receives the 8 bit shift count, a logical shift/rotate indication 172, selecting either a logical shift or rotate function, and a direction indication (right or left) 177. The right/left indication 177 is provided to both the first and second level shifters. The decoder 170 provides logical shift control signals to the first level shifter, indicating a logical shift (requiring 0 fills). The logical shift/rotate signal 172 is also provided to the second level shifter 150 for reasons that will become apparent. The term shift is used generically herein to describe both logical shifts which require zero fill and rotate functions (barrel shifts). Where one type of shift needs to be distinguished from another, the terms logical shift and rotate will be utilized.

The decoder 170 utilizes a modular ternary decoding scheme specifically implemented for nine bit data. Referring to FIG. 1b, the shift counts of 0 to 8 received by the decoder are logically grouped into three blocks. Each block contains three shifts counts. Block 101 contains shift counts of 0, 1 and 2. Block 103 contains shift counts of 3, 4 and 5 and block 105 contains shift counts of 6, 7 and 8. The decoder decodes the first block from the shift count of 0–2. As seen in the Block Select field, any shift count of 0, 1, or 2 will result in a decode of the first block, a decode value representing 0. Note that for decoding the first block, the two MSBs and one of the two LSBs must be 0. For decoding the second block the decode bits are shown. The decoder will decode a shift count of 3, 4, 5 as the second block with a decode value representing 1. The shift counts of 6, 7, and 8 in the third block, have a decode value representing 2. Thus, the first block is identified with the shift count of 0, the second block with the shift count of 3 and the third block with a shift count of 6. The shift controls are provided to the second level shifter to select either a 0, 3, or 6 bit shift, depending upon which block was decoded. In addition, since the three block selects are mutually exclusive, it is only necessary to decode any two out of three. The third block select can be a NOR of the two that are decoded.

The decoder also decodes the shift count to provide the bit selects. The bit select decode is provided to the first level shifter to control the first level shifts of 0, 1 or 2. The bit shifts within each block can be decoded by inspecting only two bits identified as 'n' in FIG. 1b under the heading "decode bits." Thus, for block 101, the two LSBs of the shift count determine the bit shift, of 0, 1 or 2. For block 103, the 'n' bits have values of 1, 2, and 3 and have to be decoded to represent shifts of 0, 1 and 2 within block 103. For block 105, the first level shift count is selected by the indicated MSB and LSB bits, which will indicate values of 0, 1 or 2.

FIG. 2 depicts a 3-bit ternary based barrel shifter block 200, which can be used as the lowest level modular building block of the invention disclosed herein. Shift controls, X, Y and Z control shifts of left/right, of 0, 1 or 2 bits. Right shift are performed on the input A bus (A0, A1, A2) and left shift operations are performed on the input B bus (B0, B1, B2). Shift X controls transistor switches 211, 213 and 215. When shift X is asserted, transistors 211, 213 and 215 pass the values on A0, A1, and A2 respectively to output bus (Out0, Out1, Out2). Thus, the contents of the A bus is passed without any shifting.

Shift Y controls transistor switches 221, 223 and 225. When shift Y is asserted, transistors 221, 223 and 225 pass the contents of A2, B0, B1 respectively to output bus (Out0, Out1, Out2). Shift Z controls transistor switches 231, 233 and 235. When shift Z is asserted, transistors 231, 233 and 235 pass the contents of A1, A2 and B0, respectively, to output bus (Out0, Out1, Out2).

FIG. 3a shows the response of the 3-bit ternary based barrel shifter block 200 to the control signals shift X, shift Y and shift Z. As can be seen in FIG. 3a, shift X causes the A-bus to be passed to the outputs. Shift Y shifts the A bus right by two and shifts the B bus left by one. Shift Z shifts the A bus right by one and shifts the B bus left by 2. For rotate operations, the A bus is conceptually connected to the B bus as shown in FIG. 3b. The B bus is used for left shift operations and the A bus is used for right shift operations. For logical shift operations, the fill bits, i.e., those bits shifted into the left end for a right shift, and right end for a left shift, should be set to 0. For example, for a shift Z, logical left shift operation, the A bus should be set to 0. Thus, with the A bus set to 0, the shift result would be B0, 0, 0 (B0, A2, A1). For logical right shift operations, the B bus is set to 0 to provide 0 fills.

Figure 4:
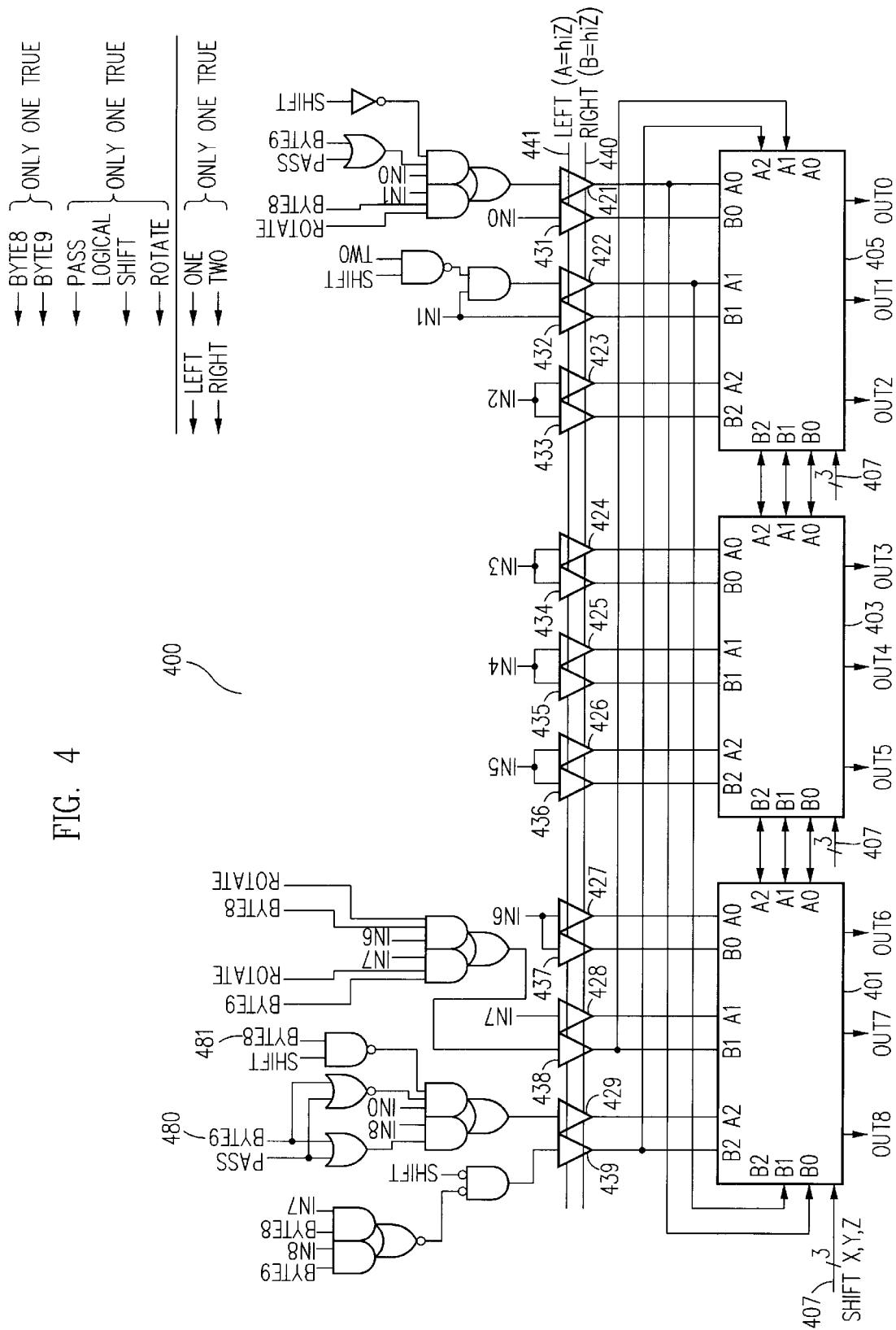
FIG. 4a shows a first level 8/9 bit shift/rotate block that shifts by 0, 1 or 2 bits.

Referring now to FIG. 4, three 3-bit ternary based barrel shifter blocks 401, 403 and 405, which are identical to block 200 in FIG. 2, can be cascaded to provide a 9-bit first level shifter 400 which can shift 8/9 bits by 0, 1 or 2 bit positions. The first level shifter 400 receives 9 input data bits, IN0–IN8. The three bit shifter blocks 401, 403 and 405 receive shift X, Y, Z control signals 407. The A and B buses on each 3 bit shifter block are interconnected. Thus, the A0, A1, and A2 inputs on block 403 are connected to the B0, B1 and B2 inputs on block 405. The A bus on block 401 connects to the B bus on block 403 and the A bus on block 405 wraps around to connect to the B bus on block 401. These interconnections provide logical shift/rotate capability between blocks.

A first group of nine tristate drivers 421–429 connect the A bus inputs on the three 3-bit blocks 401, 403 and 405 to IN0–IN8. Right shift signal 440 enables the first group of tristate drivers. A second group of nine tristate drivers 431–439 connect the B bus inputs on 3-bit blocks 401, 403 and 405 to IN0–IN8. Left shift signal 441 enables the second group of tristate drivers. The control signals 440 and 441 are mutually exclusive.

The first level shift block 400 receives shift control signals ONE and TWO which indicate respectively a one and two bit shift operation. The first level shift block 400 receives signals BYTE8 and BYTE9, which indicate an 8 bit or 9 bit word, respectively. BYTE8 and BYTE9 are mutually exclusive. Block 400 receives control signals PASS, LOGICAL SHIFT, and ROTATE. The LOGICAL SHIFT combined with the ONE and TWO signal combine to provide 0 fill bits appropriately. The logic shown in FIG. 4 functions according to Table 1.

Thus, when PASS is active, the input bits IN8–IN0 are passed to the output. For 8 bit data BYTE8 is asserted, and the MSB output bit OUT8 is ignored. The notation in Table 1 indicates, e.g., for Case 2, that nine bit data is rotated to the left by one bit. The B bus is active for left shifts. The resultant bit pattern on the outputs is shown as 765432108. The BYTE8 and BYTE9 signals are indicated by B8 and B9 in Table 1. The PASS, LOGICAL SHIFT, and ROTATE controls signals in FIG. 4 are indicated in Table 1 by Pass, SHF and ROT. The control signals ONE and TWO and left and right are indicated by the <<1, <<2, >>1 and >>2.

TABLE 1

| | Operation | Active Bus | Bits 876543210 | Notes |
|---|---|---|---|---|
| Case 1 | Pass | | 876543210 | |
| Case 2 | B9 ROT<<1 | (B Bus) | 765432108 | |
| Case 3 | B8 ROT<<1 | (B Bus) | 765432107 | 7 on MSB is ignored |
| Case 4 | B9 SHF<<1 | (B Bus) | 76543210Z | Z indicates a 0 |
| Case 5 | B8 SHF<<1 | (B Bus) | 76543210Z | 7 on MSB is ignored |
| Case 6 | B9 ROT>>2 | (A Bus) | 108765432 | |
| Case 7 | B8 ROT>>2 | (A Bus) | 110765432 | 1 on MSB is ignored |
| Case 8 | B9 SHF>>2 | (A Bus) | 008765432 | |
| Case 9 | B8 SHF>>2 | (A Bus) | ZZZ765432 | Z on MSB is ignored |
| Case 10 | B9 ROT>>1 | (A Bus) | 087654321 | |
| Case 11 | B8 ROT>>1 | (A Bus) | 107654321 | 1 on MSB is ignored |
| Case 12 | B9 SHF>>1 | (A Bus) | Z87654321 | |
| Case 13 | B8 SHF>>1 | (A Bus) | ZZ7654321 | Z on MSB is ignored |
| Case 14 | B9 ROT<<2 | (B Bus) | 654321087 | |
| Case 15 | B8 ROT<<2 | (B Bus) | 654321076 | 6 on MSB is ignored |
| Case 16 | B9 SHF<<2 | (B Bus) | 6543210ZZ | |
| Case 17 | B8 SHF<<2 | (B Bus) | 6543210ZZ | 6 on MSB is ignored |

The 9 bit first level shifter can logically shift or rotate the input bits IN8–IN0 by 0, 1 or 2 bits. For rotate operations on 9 bit data, IN0 is connected to IN8. For rotate operations on 8 bit data, IN0 is connected to IN7. For logical shift operations, a 1 or 2 bit zero fill is used as appropriate depending in the size of the shift operations. Thus, the 3-bit ternary based barrel shifter block 200 can be used as a modular building block for a first level shifter that provides logical shift/rotate capability for 8/9 bit data for logical shift/rotate of 0, 1 and 2 bits.

Figure 5:
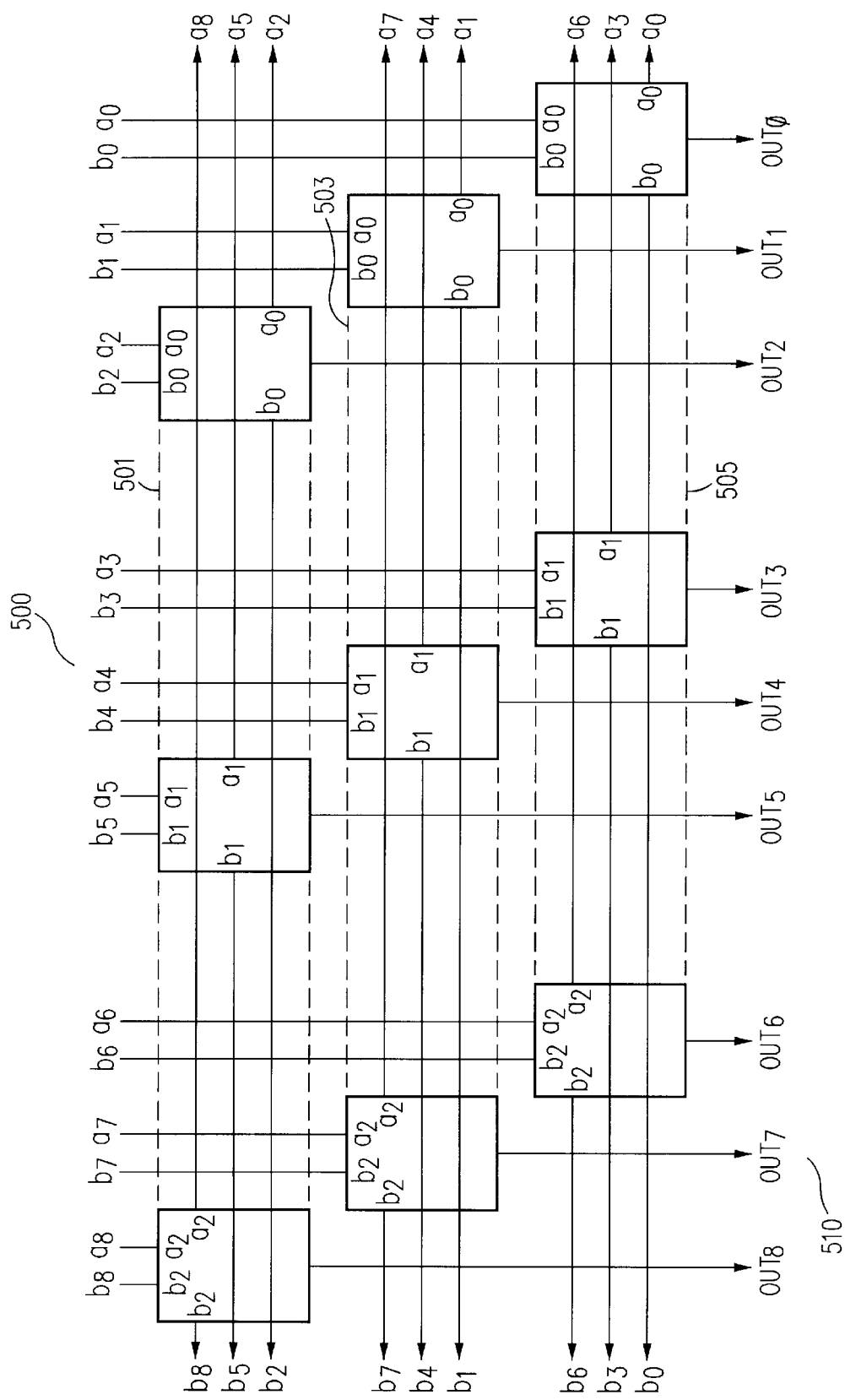
FIG. 5 shows a second level 8/9 bit shift/rotate block that shifts, by 0, 3 or 6 bits.

Referring now to FIG. 5, the 3-bit ternary based barrel shifter block 200 can be used as the building block for the second level shifter 500 that can shift/rotate 9 bit input data by 0, 3, or 6 bit positions. Second level shifter 500 has three 3-bit shift blocks 501, 503 and 505 stacked on top of one another. The first block 501 receives inputs b8 and a8, b5 and a5, and b2 and a2. Block 503 receives inputs b7 and a7, b4 and a4, b1 and a1. Block 505 receives inputs b6 and a6, b3 and a3, b0 and a0. The input bus A (a8–a0) is used for right shifts and the B bus (b8–b0) is used for left shifts.

The shifting function of second level shifter 500 is shown in FIG. 6a. For a left/right shift of 0 bits (shift x) the shifter 500 passes the A bus onto output bus 510 (out8–out0) as shown in 601. For a shift operation of (left 6/right 3) (shift Z), the output bus 510 (out8–out0) takes the values as shown in 603. For a shift operation of (left 3/right 6) (shift Y), the output bus 510 (out8–out0) takes on the values as shown in 605. For logical shift left operations, the appropriate bits of the A bus are set to 0 to provide the 0 fill bits. For right shift operations, appropriate bits of the B bus are set to 0 to provide fill bits. Referring to FIGS. 7a and 7b, a logical shift left signal forces a3–a8 to 0 through AND gates 701–706. A logical shift right signal causes bits b0 to b5 to be set to 0 through AND gates 711–716. Thus, for example, for a 3 bit logical left shift operation, bits a6, a7, and a8 shown at 605 would be 0's.

The first level shifter 400, can be combined with the second level shifter 500 such that the outputs 510 from the second level shifter 500 are provided as inputs IN8–IN0 to the first level shifter 400. That combination provides a full 8/9 bit shifter unit which can logically shift/rotate right or left by 0 to 8 bits.

Referring to FIG. 6b, it is now more easily understood how the decode scheme disclosed herein is utilized by the two level structure of shifters 400 and 500. FIG. 6b details the first and second level shift controls, X, Y and Z based on the shift count. Thus, for example, consider a shift count of 4, which is in the second block. For the second level shifter, shift Z is asserted for a right shift, and shift Y for a left shift. That selects a second level shift of 3 bits. The first level shifter block receives a shift Z for a right shift and a shift Y for a left shift. That selects a one bit shift. Thus, the input operand is shifted a total of four bits. The logical shift controls indicate which of shift 1 or shift 2 is asserted when a logical shift signal is asserted for the various shift counts. The logical shift control signals shift 1 and shift 2 are represented as ONE, TWO and LOGICAL SHIFT in FIG. 4. For the second level shifter, the logical shift signal is fed directly to control the zero fills. The decoder 170 uses the logical shift/rotate indication, the left/right indication and the shift count to decode the appropriate control signals supplied in the form of shift X, shift Y, or shift Z, to the first and second level shift blocks. The left/right indication, the logical shift/rotate indications and the bit shift count are provided in the control signals 441 (left shift), 440 (right shift), and ONE, TWO, LOGICAL SHIFT, ROTATE and SHIFT X, Y, and Z, which are supplied to first level shifter 400.

Figure 8:
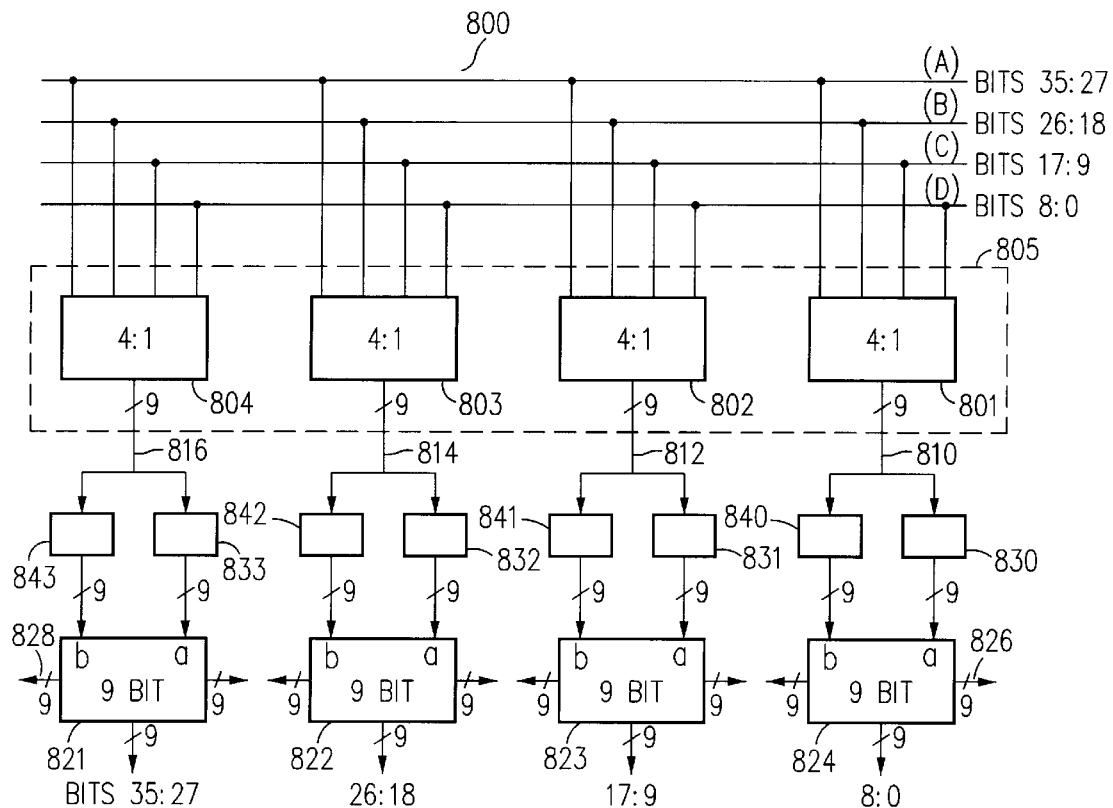
FIG. 8 shows a three level 36 bit shifter unit.
Figure 9:
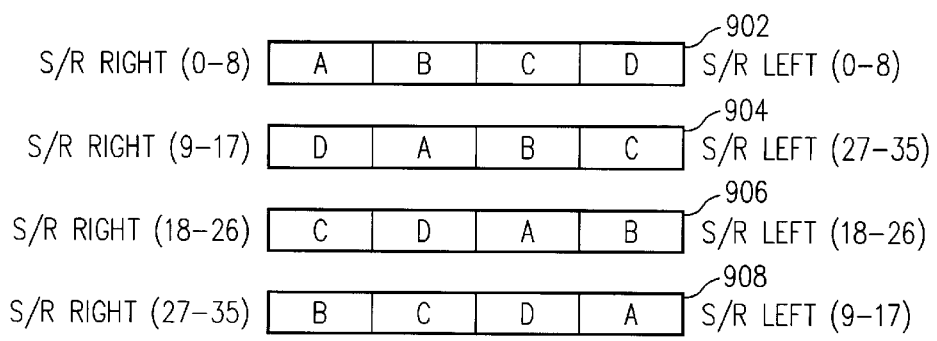
FIG. 9 shows the shift/rotate function of the third level shifter.

This modular two level shifter structure can be expanded and combined with a third level shifter to provide in one preferred embodiment, a 36 bit shift unit. Referring now to FIG. 8, three level shifter 800 includes four 9 bit two level shift blocks 821–824 juxtaposed to form a 36 bit wide data path. Four 4:1 multiplexers 801–804 form a third level 805 of a 36 bit three level shifter. The third level shifter can shift each bit by 0, 9, 18, and 27 bits. Thus, as seen in FIG. 9, for a shift count of between 0 and 8 bits, the third level shifter 805 passes the input data to the outputs without shifting as shown in 902. The two level shifters 821–824 then perform shifting of 0 to 8 bits in a manner already discussed. For shift operations of between 9 and 17 bits right (27–35 left), shifter 805 selects output data as shown in 904. In this case, the third level shifter provides a 9 bit right shift (27 bit left shift) and the two level shifters 821–824 provide any additional shifting of between 9 and 17 bits. For shift operations of 18–26 bits right/left, the multiplexers 801–804 of shifter 805 select the input as shown at 906 with the additional shifting done by the lower level shifters. Finally, for shift operations of 27–35 bits right (9–17 bits left), the multiplexers 801–804 perform the selection shown at 908 with any required additional shifting done by the lower level shifters.

Logical shift operations, where fill in bits are required, require certain of the outputs 810, 812, 814 and 816 to be forced to zero. Thus, for a logical shift right of 9–17 bits, the 9 data bits 816 are forced to 0 by, e.g., AND gates (not shown). For a logical shift right of 18–26 bits, the outputs 816 and 814 are gated to 0. For a logical shift right of 27–35 bits, the data bits on 816, 814 and 812 are forced to 0. For logical left shifts of 27–35 bits, the outputs 810, 812 and 814 are forced to 0. For a logical left shift of 18–26 bits, the outputs on 812 and 810 are forced to 0. For logical left shift of 9–17 bits, the data bits on 810 are forced to 0.

Figure 11:
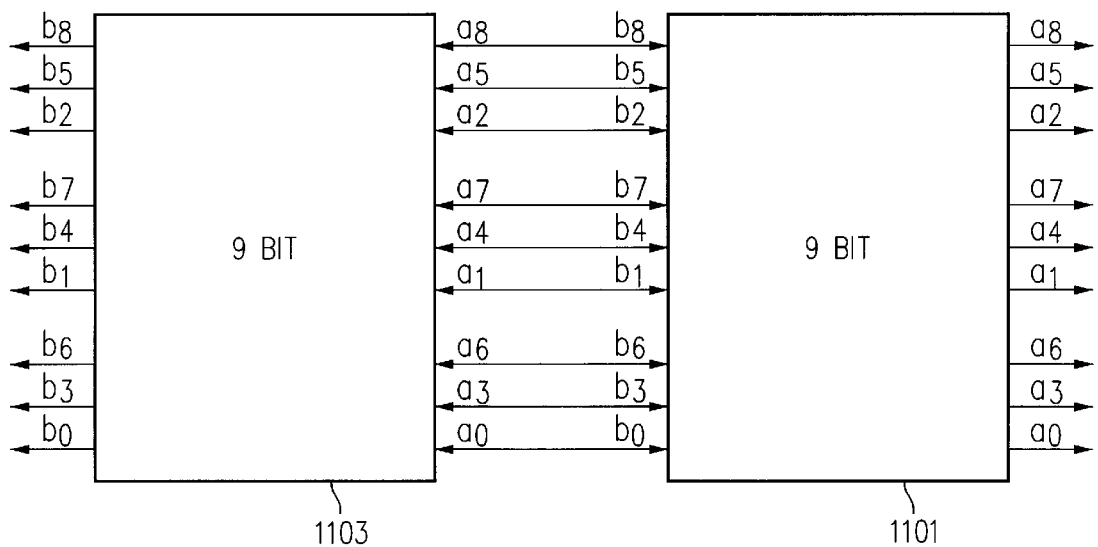
FIG. 11 shows the connections between second level blocks in a 3 level shifter.

The two level blocks 821–824 require interconnections for each second level contained therein. The connections are shown in FIG. 11. As shown, the second level B bus (b0–b8) on block 1101 is connected to the second level A bus on block 1103. For the end blocks, the A bus (a0–a8) 826 on block 824 is connected to the B bus (b0–b8) 828 on block 821. Each nine bit bus 810–816 output from the third level must be driven through tristate drivers. Thus, buses 810–816 are driven through tristate driver blocks 840–843, each containing nine tristate drivers, for the B bus inputs (b0–b8) of the second level shifter blocks. Tristate driver blocks 840–843 are driven when the left shift signal (same control signal as 441) is asserted and tristated when the right shift signal (same as control signal as 440) is asserted. Each 9 bit bus 810–816 is connected to the second level A bus (a0–a8) through tristate drivers in blocks 830–833 and are enabled by the right shift signal. Thus, consistent with the lowest level 3-bit block, the 'B' bus is used for left shift operations and the 'A' bus for right shift operations.

The first level shifters in a 36 bit wide shifter are interconnected by connecting each B0, B1, B2 input to the A0, A1, A2 output of the neighboring blocks. The end blocks of the 36 bit wide first level shifter are connected by wrapping the B0, B1, B2 connectors of the left most 3-bit block around to connect the A0, A1, A2 connections on the right most 3-bit block.

Figure 10:
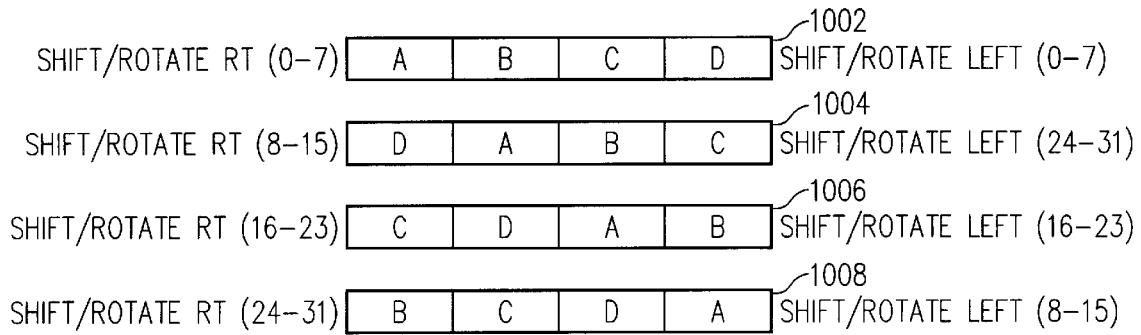
FIG. 10 shows the shift/rotate function for 32 bit data.

The three level shifter can also accommodate other data types, e.g., 32 bits. For 32 bit shift operations, the multiplexers perform the shift operations as shown in FIG. 10. As seen at 1002, no shift occurs in the third level shifter for shifts of between 0 and 7. For right shifts of 8–15 bits (24–31 left), the multiplexers 801–804 of shifter 805 select the output data as shown at 1004. The other shift values are shown at 1006 1008. For 32 bit data operations, the most significant bit out of each shifter block is ignored, i.e., bits 8, 17, 26 and 35 although the full shift takes place. For example, a 24 bit shift right (1008) for 32 bit data is performed the same as a 27–35 bit right shift for 36 bit data by shifter 805. Generally, for 8, 16 and 32 bit operations in a modular 9 bit system disclosed herein, the ninth (MSB) data bit is ignored.

The description of the invention set forth herein is illustrative, and is not intended to limit the scope of the invention as set forth in the following claims. For example, the width of the three level shifter is not limited to 36 bits, but could, e.g., be 27 bits or 45 bits. Variations and modifications of the embodiments disclosed herein, may be made based on the description set forth herein, without departing from the scope and spirit of the invention as set forth in the following claims.

What is claimed is:

1. An shift apparatus comprising:
   a second level shifter receiving 9 input data bits, the second level shifter shifting the 9 input data bits by 0, 3 and 6 bit positions according to second level shift signals, and outputting 9 second level data bits; and
   a first level shifter, the first level shifter receiving the second level data bits and shifting the second level data bits by 0, 1 or 2, bit positions according to first level shift signals,
   the first and second level shifter thereby shifting the 9 input data bits by 0 to 8 bits.

2. A shift apparatus as recited in claim 1 wherein the first level shifter comprises first, second and third 3-bit shift blocks.

3. A shift apparatus as recited in claim 2 wherein the second level shifter comprises fourth, fifth and sixth 3-bit shift blocks.

4. A shift apparatus as recited in claim 3 wherein each 3-bit shift block comprises:
   first through sixth data inputs coupled respectively to first through sixth input data signals;
   a first, second and third transistor switch coupled to a first control signal and coupled respectively to the first, second and third input data signals, the first, second and third switches transmitting, respectively, the first, second and third input data signals as a first, second and third output signal, according to the level of the first control signal;
   a fourth, fifth, and sixth transistor switch coupled to a second control signal and coupled respectively to the second, the third and fourth input data signals, the fourth, fifth and sixth switches transmitting, respectively, the second, third and fourth input data signals as the first, second and third output signals, according to the level of the second control signal; and
   a seventh, eighth and ninth transistor switch coupled to a third control signal and coupled respectively to the third, the fourth and a fifth input data signals, the seventh, eighth and ninth switches transmitting, respectively, the third, fourth and fifth input data signals as the first, second and third output signals, according to the level of the third control signal.

5. A shift apparatus as recited in claim 4 wherein in the first level shifter, the first through third 3-bit shift blocks are connected together to provide a first through 9th output,
   the fourth, fifth, and sixth data inputs on the first and second 3-bit shift blocks are coupled, respectively, to the first, second and third data inputs on the second and third 3-bit shift block,
   fourth, fifth, and sixth data inputs on the third 3-bit shift block are coupled, respectively, to the first, second and third data inputs on the first 3-bit shift block.

6. The shift apparatus of claim 5 further comprising:
   a first group tristate drivers, connected to a first tristate driver control, the first group of tristate drivers being coupled, respectively, to the first, second and third data inputs of the first through third 3-bit shifts blocks; and
   a second group tristate drivers, connected to a second tristate driver control, the second group of tristate drivers being coupled, respectively, to the fourth, fifth and sixth data inputs of the first through third 3-bit shift blocks.

7. The shift apparatus of claim 6 wherein the first tristate driver control is a right shift indication and the second tristate driver control is a left shift indication, the left and right shift indications being mutually exclusive and wherein each first and second group is comprised of nine tristate drivers.

8. The shift apparatus of claim 7 further comprising:
   a logical shift logic circuit receiving a logical shift indication, the assertion of the logical shift indication causing the shift logic circuit to provide predetermined ones of the tristate drivers with a logic value of zero.

9. The shift apparatus of claim 7 wherein the shift indication indicates one of a one bit logical shift and a two bit logical shift.

10. A shift apparatus as recited in claim 4 wherein in the second level shifter,
    the fourth 3-bit shift block is coupled to the third, sixth and ninth input data bits and outputs the third, sixth and ninth second level data bits;
    the fifth 3-bit shift block is coupled to the second, fifth, and eighth input data bits and outputs the second, fifth and eighth second level data bits; and
    the sixth 3-bit shift block is coupled to the first, fourth, and seventh input data bits and outputs the first, fourth and seventh second level data bits.

11. The shift apparatus as recited in claim 1 further comprising:
    an eight bit logic circuit, the eight bit logic circuit receiving an eight bit signal indication, the eight bit signal indication, when asserted, configuring the shift apparatus to shift eight bits of data.

12. The shift apparatus as recited in claim 1, further comprising:

a decoder receiving a shift count and providing the first and second level shift signals, the decoder decoding the shift count to set the second level shift signals to indicate a 0 bit shift, when the shift count is 0, 1 and 2, the decoder decoding the shift count to set the second level shift signals to indicate a 3 bit shift, when the shift count is 3, 4 and 5, the decoder decoding the shift count to set the second level shift signals to indicate a 6 bit shift, when the shift count is 6, 7 and 8, the decoder decoding the shift count to set the first level shift signals to indicate a 0 bit shift when the shift count is 0, 3 and 6, the decoder decoding the shift count to set the first level shift signals to indicate a 1 bit shift when the shift count is 1, 4 and 7, the decoder decoding the shift count to set the first level shift signals to indicate a 2 bit shift when the shift count is 2, 5 and 8.

13. The shift apparatus as recited in claim 1 further comprising:

a decoder, the decoder receiving a shift count and outputting first and second level shift signals, the shift count being represented as four binary bits, $b_1$, $b_2$, $b_3$, $b_4$, with $b_4$ being the least significant bit, the shift count being divided into a first, second and third blocks, the first block containing shift counts 0, 1 and 2, the second block containing shift counts 3, 4 and 5 and the third block containing shift counts of 6, 7 and 8, the shift count being decoded to provide block selects and bit selects, the block selects indicating the shift count for the second level shift signals of 0 3 and 6, the bit selects indicating a shift count for the first level shift signals of 0, 1 and 2, and wherein bits $b_3$ and $b_4$ of the shift count are used to determine the bit select for the first block, bits $b_2$ and $b_4$ of the shift count are used for the bit select for the second block, and bits $b_1$ and $b_4$ of the shift count are used for the bit select for the third block.

14. The shift apparatus of claim 1 wherein the shift apparatus performs a rotation operation of the input data bits according to a rotate control signal.

15. The shift apparatus of claim 14 wherein the shift apparatus performs a logical shift of the input data bits according to a logical shift control signal.

16. The shift apparatus of claim 15 wherein the rotate control signal and the logical shift control signal are mutually exclusive.

17. A shift apparatus comprising:

a second level shifter receiving N input data bits, $N \geq 8$, and performing one of a 0, 3 and 6 bit shift according to a second level shift indication, and outputting N second level data bits; and a first level shifter receiving the N second level data bits and performing one of a 0, 1 and 2 bit shift/rotate operation according to a first level shift indication.

18. A shift apparatus comprising:

a third level shifter receiving N input bits and outputting the N input bits shifted by multiples of nine as N first level output bits according to a third level shift indication;

a second level shifter coupled to the N first level output bits and outputting the N first level output bits shifted by 0, 3 and 6 bit positions, according to a second level shift indication, as N second level output bits; and a first level shifter coupled to the N second level output bits, and shifting the N second level output bits by 0, 1 or 2, bit positions according to a first level shift signal, the first, second and third level shifter thereby providing a shift of from 0 to (N−1) bits for the N input bits.

19. A shift apparatus as recited in claim 18 where N is 36 and wherein the third level shifter comprises four, four to one, nine bit multiplexers.

20. A shift apparatus as recited in claim 19 wherein the second level shifter comprises first, second, third and fourth second level nine bit shift blocks, each second level nine bit shift block being comprised of three 3-bit shift blocks.

21. The apparatus as recited in claim 20 wherein the first level shifter comprises four first level nine bit shift blocks, each first level nine bit shift block being composed of three 3-bit shift blocks.

22. An apparatus as recited in claim 21 wherein the 3-bit shift block comprises:

a first, second and third transistor switch coupled to a first control signal and coupled respectively to a first, second and third input data signal, the first second and third switches transmitting, respectively, the first, second and third input data signals as a first, second and third output signal, according to the level of the first control signal;

a fourth, fifth, and sixth transistor switch coupled to a second control signal and coupled respectively to the second, third and a fourth input data signal, the fourth, fifth and sixth switches transmitting, respectively, the second, third and fourth input data signals as the first, second and third output signals, according to the level of the second control signal; and a seventh, eighth and ninth transistor switch coupled to a third control signal and coupled respectively to the third, the fourth and a fifth input data signal, the seventh, eighth and ninth switches transmitting, respectively, the third, fourth and fifth input data signals as the first, second and third output signals, according to the level of the third control signal.

23. An shift apparatus as recited in claim 19 wherein the three level shift apparatus performs logical shifts and rotates on the N input bits according to a logical shift control signal and rotate control signal.

24. A method of performing a shift operation on nine input data bits in a two level shift apparatus having a first and second level shifter, according to a shift count of 0 to 8, the shift count being represented as four binary bits, $b_b$, $b_2$, $b_3$, $b_4$, with $b_4$ being least significant, the method comprising the steps of:

dividing the shift count into first, a second and a third blocks, the first block including the shift count of 0, 1 and 2, the second block including the shift count of 3, 4, and 5, and the third block including the shift count of 6, 7 and 8;

selecting one of the first, second and third blocks according to block select bits contained in the shift count;

determining the shift count of 0, 1, and 2 within the selected block according to bit select bits contained in the shift count;

providing the second level shifter with an indication of the selected block to select a shift of 0, 3 or 6 bits; and providing the shift count within the selected block to the first level shifter to select a shift of 0, 1 or 2 bits.

25. The method as recited in claim 24 further comprising:

selecting the first block according to the expression ($\overline{b_1b_2b_3}+\overline{b_1b_2b_4}$);

selecting the second block according to the expression ($\overline{b_2b_3b_4}+b_2\overline{b_3}$); and selecting the third block according to the expression ($b_1+b_2b_3$).

26. The method as recited in claim 25, further comprising the steps of:

decoding bits $b_3$ and $b_4$ to determine the shift count within the first block;

decoding bits $b_2$ and $b_4$ to determine the shift count within the second block; and decoding bits $b_1$ and $b_4$ to determine the shift count within the third block.

27. A method of shifting input data bits in a two level shifter, comprising the steps of:

shifting the input data bits in a second level shifter by one of 0, 3 and 6 bit positions, according to a second level shift indication to provide second level data bits;

shifting the second level data bits in a first level shifter by one of 0, 1 and 2 bit positions according to a first level shift indication, to provide first level data bits, the first level data bits representing the input data bits shifted by 0 to 8 bits.

* * * * *